(12) United States Patent
Takahashi

(10) Patent No.: US 11,641,398 B2
(45) Date of Patent: May 2, 2023

(54) SECURE DATA TRANSFER OVER WIRELESS NETWORKS USING DATA STORAGE ENCRYPTORS

(71) Applicant: Securion Systems, Inc., Centerville, UT (US)

(72) Inventor: Richard J. Takahashi, Layton, UT (US)

(73) Assignee: SECTURION SYSTEMS, INC., Centerville, UT (US)

( * ) Notice: Subject to any disclaimer, the term of this patent is extended or adjusted under 35 U.S.C. 154(b) by 0 days.

(21) Appl. No.: 17/853,780

(22) Filed: Jun. 29, 2022

(65) Prior Publication Data

US 2023/0028917 A1     Jan. 26, 2023

Related U.S. Application Data

(60) Provisional application No. 63/221,789, filed on Jul. 14, 2021.

(51) Int. Cl.
    *H04L 67/1097*    (2022.01)
    *H04L 9/08*    (2006.01)
    *H04L 67/06*    (2022.01)

(52) U.S. Cl.
    CPC ........ *H04L 67/1097* (2013.01); *H04L 9/0825* (2013.01); *H04L 67/06* (2013.01)

(58) Field of Classification Search
    CPC .... H04L 67/1097; H04L 9/0825; H04L 67/06
    See application file for complete search history.

(56) References Cited

U.S. PATENT DOCUMENTS

| | | | |
|---|---|---|---|
| 8,407,759 B1 * | 3/2013 | Sotos | G06F 21/78 |
| | | | 455/39 |
| 9,189,493 B2 | 11/2015 | Olderdissen et al. | |
| (Continued) | | | |

FOREIGN PATENT DOCUMENTS

| | | | | |
|---|---|---|---|---|
| CN | 110839266 A | * | 2/2020 | ............. H04L 69/22 |
| CN | 112419814 A | * | 2/2021 | |
| (Continued) | | | | |

OTHER PUBLICATIONS

Korean Intellectual Property Office; PCT International Search Report, issued in connection to application No. PCT/US2022/035595; dated Oct. 19, 2022; 5 pages; Korea.

(Continued)

*Primary Examiner* — Shean Tokuta
(74) *Attorney, Agent, or Firm* — Greenberg Traurig LLP

(57) ABSTRACT

Systems, methods, and apparatus related to transferring encrypted data over a wireless network. In one approach, an encryptor includes a host interface configured to transmit data and commands with a local computing device, a wireless communication interface configured to transmit data and commands over a radio access network, a storage interface configured to interface a local storage medium to store data, and at least one processing device configured to perform operations comprising: encrypting first data from the local computing device to be written into the local storage medium upon receiving a first command from the local computing device; decrypting the encrypted first data from the local storage medium to be read by the local computing device upon receiving a second command from the local computing device; and transmitting the encrypted first data through the wireless communication interface to the radio access network upon receiving a third command.

20 Claims, 7 Drawing Sheets

(56) References Cited

U.S. PATENT DOCUMENTS

| | | | |
|---|---|---|---|
| 9,361,479 B2 | 6/2016 | Lesavich et al. | |
| 9,449,183 B2 | 9/2016 | Wu | |
| 10,713,859 B1* | 7/2020 | McZeal, Jr. | G01S 19/17 |
| 10,805,349 B2 | 10/2020 | Shaw et al. | |
| 10,911,518 B2 | 2/2021 | Houston et al. | |
| 11,336,011 B2* | 5/2022 | Tran | H01Q 21/28 |
| 2006/0190724 A1 | 8/2006 | Adams et al. | |
| 2010/0153747 A1 | 6/2010 | Asnaashari et al. | |
| 2013/0132739 A1* | 5/2013 | Matsushiba | G06F 21/35 |
| | | | 713/193 |
| 2013/0290718 A1 | 10/2013 | Zhuang et al. | |
| 2013/0311737 A1 | 11/2013 | Shaw et al. | |
| 2014/0289759 A1* | 9/2014 | Nakano | H04N 21/2347 |
| | | | 725/31 |
| 2015/0058637 A1 | 2/2015 | Raskin et al. | |
| 2015/0363763 A1* | 12/2015 | Chang | H04W 12/069 |
| | | | 705/64 |
| 2015/0381612 A1* | 12/2015 | Chang | H04W 12/069 |
| | | | 713/193 |
| 2016/0127326 A1* | 5/2016 | Lin | H04W 12/04 |
| | | | 713/171 |
| 2016/0156462 A1* | 6/2016 | Winslow | H04L 9/0891 |
| | | | 380/279 |
| 2016/0239232 A1* | 8/2016 | Chang | H04W 12/033 |
| 2017/0091123 A1* | 3/2017 | Sato | G06F 21/6209 |
| 2018/0048710 A1 | 2/2018 | Altin | |
| 2018/0219672 A1* | 8/2018 | Schopp | H04L 9/0816 |
| 2019/0188161 A1* | 6/2019 | Zhang | G06F 3/0623 |
| 2020/0008051 A1* | 1/2020 | Hill | H04W 12/04 |
| 2020/0394651 A1* | 12/2020 | Kreder, III | G06Q 20/389 |
| 2021/0149824 A1* | 5/2021 | Satpathy | G02B 27/017 |
| 2021/0184832 A1* | 6/2021 | Satpathy | H04L 9/088 |
| 2022/0123932 A1* | 4/2022 | Klapman | G06F 3/0679 |

FOREIGN PATENT DOCUMENTS

| | | | | |
|---|---|---|---|---|
| WO | WO-2017177362 A1 * | 10/2017 | | G06F 12/0246 |
| WO | WO-2020089643 A1 * | 5/2020 | | G07C 5/008 |
| WO | WO-2020249786 A1 * | 12/2020 | | A24F 40/53 |

OTHER PUBLICATIONS

Korean Intellectual Property Office; PCT Written Opinion of the International Searching Authority, issued in connection to application No. PCT/US2022/035595; dated Oct. 19, 2022; 6 pages; Korea.

* cited by examiner

US 11,641,398 B2

SECURE DATA TRANSFER OVER WIRELESS NETWORKS USING DATA STORAGE ENCRYPTORS

RELATED APPLICATIONS

This application claims priority to U.S. Provisional Application Ser. No. 63/221,789, filed Jul. 14, 2021, entitled "SECURE DATA TRANSFER OVER WIRELESS NETWORKS USING DATA STORAGE ENCRYPTORS," by Richard J. Takahashi, the entire contents of which application is incorporated by reference as if fully set forth herein.

FIELD OF THE TECHNOLOGY

At least some embodiments disclosed herein relate to secure data systems in general, and more particularly, but not limited to secure data transfer over wireless networks (e.g., 5G networks) using data storage encryptors.

BACKGROUND

In telecommunications, for example, 5G is the fifth-generation technology open standard for broadband cellular networks. 5G networks are cellular networks, in which a service area is divided into small geographical areas called cells. All 5G wireless devices in a cell are connected, for example, to the Internet and/or telephone network by radio waves through a local antenna in the cell. An advantage of new 5G networks is it is an open standard and will have greater bandwidth, resulting in higher download speeds (e.g., at least 10 gigabits per second). Due to the 5G open standards and increased bandwidth, it is expected the networks will increasingly be used as general internet service providers for laptops and desktop computers, competing with existing ISPs such as cable and satellite internet, and also will make possible new applications in the internet of things (IoT).

In one example, the local antennas in a 5G network are connected to transmission electronics connected to switching centers in a telephone network and/or routers for Internet access by high-bandwidth optical fiber or wireless backhaul connections. As in other cell networks, a mobile device moving from one cell to another is automatically handed off to a current cell.

In some cases, 5G networks may be subject to security threats. For example, 5G technology enables the movement and access of much higher quantities of data, and thus broadens attack surfaces. An increase in the number of IoT devices, enabled by 5G technology, is expected to be significant. This can raise the attack surface for these devices. The risk for cyberattacks increases proportionately.

BRIEF DESCRIPTION OF THE DRAWINGS

The embodiments are illustrated by way of example and not limitation in the figures of the accompanying drawings in which like references indicate similar elements.

DETAILED DESCRIPTION

The following disclosure describes various embodiments for securely transferring encrypted stored data over wireless networks. At least some embodiments relate to transferring encrypted data from a first data storage encryptor to a second data storage encryptor. In some examples, each data storage encryptor is a data at rest encryptor (sometimes referred to herein as a "DARE"). In other examples, each encryptor can be a data in use or data in transit encryptor.

Figure 6:
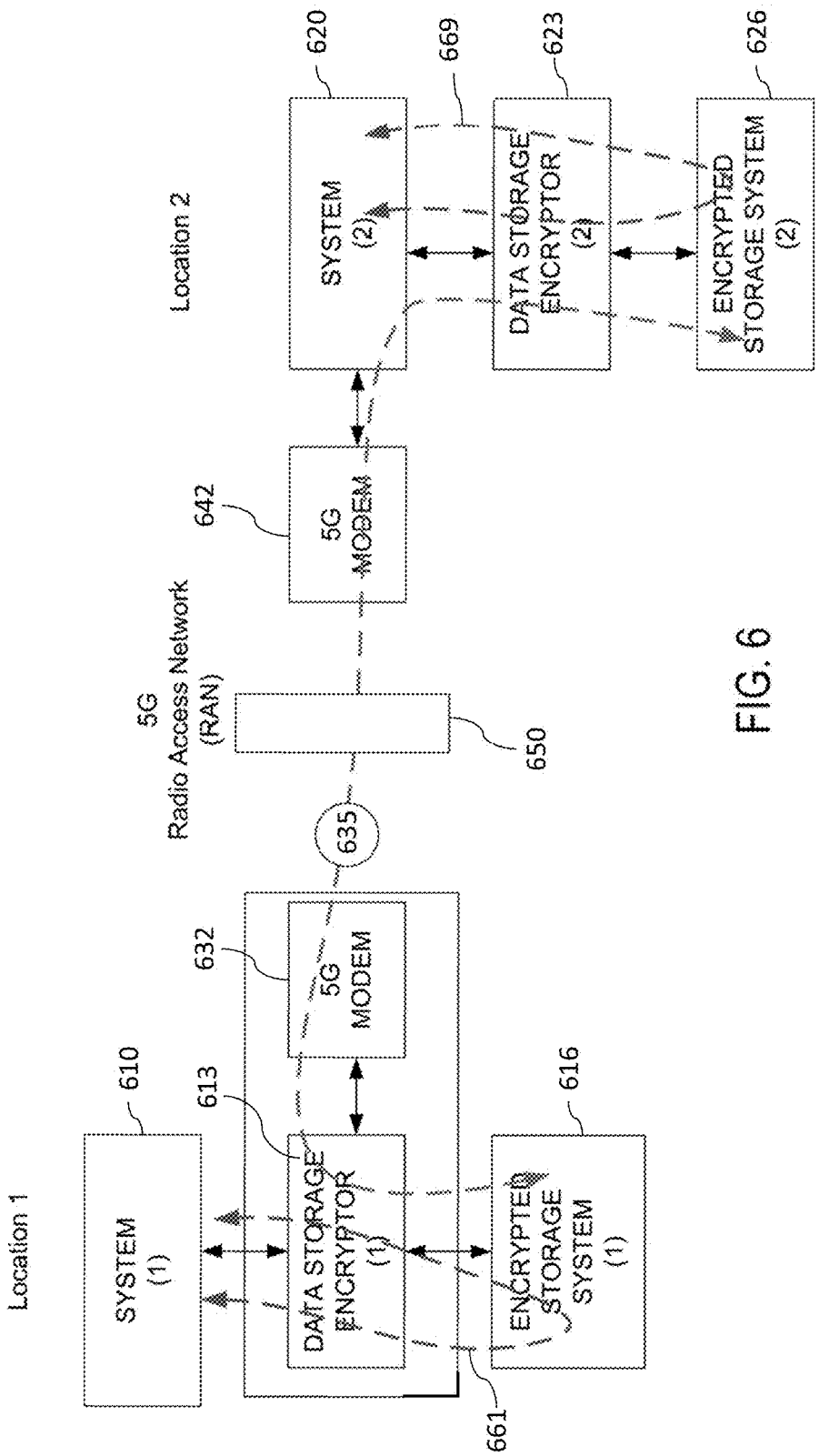
FIG. 6 shows a first data storage encryptor (1) and a second data storage encryptor (2) used to securely transfer encrypted data from a first physical location (Location 1) to a second physical location (Location 2) using a radio access network, in accordance with some embodiments.

In at least some embodiments, the data storage encryptor is transparent to the system (e.g., system 610 of FIG. 6). The system 610 believes and behaves (e.g., based on command and data interactions with an interface) that the system 610 is reading and writing data to a data storage system (e.g., a local and/or remote data storage). The data storage encryptor 613 emulates the data storage system (e.g., the encryptor 613 presents a data storage interface to system 610, with the interface including handling of read and write commands).

FIG. 6 shows a first data storage encryptor 613 and a second data storage encryptor 623 used to securely transfer encrypted data (black data) from a first physical location (Location 1) to a second physical location (Location 2) using a radio access network, in accordance with some embodiments.

In one embodiment, system 610 or system 620 reads and writes data to the respective data storage encryptor 613 or 623. System 610 writes (e.g., sends) data to the data storage encryptor 613. The data storage encryptor 613 on a write cycle will encrypt the data (with a selected key) and store the encrypted data into the encrypted data storage of encrypted storage system 616.

In one embodiment, system 610 reads stored data. The data storage encryptor 613 on a read cycle will read the encrypted data storage 616 and decrypt (with a selected key) the data and send the data to the system 610. This read process is illustrated by a dotted line 661 in FIG. 6.

In one embodiment, system 610 initiates a transfer of data to system 620. System 610 sends a request to data storage encryptor 613 that causes the transfer of data to occur. In one example, the request is in response to a command by a user in a user interface of system 610. In one example, the user interface is used by the user to manage files that are stored as encrypted data on encrypted storage system 616.

In response to receiving the request from system 610, data storage encryptor 613 sends a communication to data storage encryptor 623 using a wireless network (e.g., radio access network, or satellite network). The communication initiates an authentication process in which data storage encryptor 613 authenticates data storage encryptor 623.

If the authentication process is successful, then data storage encryptor 613 retrieves the requested data from encrypted storage system 616, and sends the data in encrypted form to data storage encryptor 623, which then stores the received data (still in encrypted form) in encrypted storage system 626. The data transfer is facilitated by a 5G modem 632 at location 1 and a 5G modem 642 at location 2 over a 5G radio access network 650. The transferred data remains encrypted during transfer from encrypted storage system 616 to encrypted storage system 612. This data transferring process is illustrated by a dotted line 635 in FIG. 6.

When desired, system 620 can read the transferred data from encrypted storage system 626. In one example, a user of system 620 makes a request for the transferred data using a user interface of system 620. In response to the request, data storage encryptor 623 retrieves the transferred data from encrypted storage system 626, decrypts the data, then provides the retrieved data to system 620 (e.g., for viewing or other use by the user). This read process is illustrated by a dotted line 669 in FIG. 6.

There is often a need to transfer data between computers. In many cases, the computers are at different physical locations. When transferring large amounts of data, failure to perform the transfer securely can expose the data to significant cyberattack, hacking, and/or other risks.

Often the transfer is performed using a wireless network or other wireless connection. However, wireless networks and other connections increase the vulnerability to cyberattacks.

The data transferred in prior approaches is sometimes encrypted. However, the typical prior approach uses encryption software, which is notoriously insecure and readily penetrated by determined hackers. Operating systems on which such software runs are also insecure.

In addition, the computer transferring the data may have limited processing power for handling the significant processing demands of encrypting large amounts of data. For example, software executing on a typical laptop is slow and cumbersome to use for secure transfer of data to another computer.

To address one or more of these and other technical problems, a system uses two encryptors to securely transfer data between two computers. Each encryptor is connected to one of the computers. The encryptors communicate with each other over a wireless network. In one example, the wireless network is a 5G wireless network. In one example, the wireless network is a satellite network. The encryptors are hardware-based instead of software-based, as in the prior approaches above.

In one embodiment, a first data encryptor includes a host interface, a wireless communication interface, a storage medium (e.g., NAND flash memory) to store data, and at least one processing device (e.g., one or more FPGAs, graphics processors, and/or microprocessors). The first encryptor receives data from a first computing device using the host interface (e.g., a serial bus interface). In response to receiving the data, the first encryptor encrypts the data using at least one key (e.g., symmetric key(s)). The encrypted data is stored in the storage medium.

In one embodiment, with reference to FIG. 6, the initiation of a secure data transfer is executed by data storage encryptors 613 and 623 under command from the respective locally-connected system 610 and 620. The system 610 will command the data storage encryptor 613 to read the encrypted storage system 616. Next, the data storage encryptor 613 will communicate with data storage encryptor 623 and authenticate data storage encryptor 623. Data storage encryptor 613 will confirm data storage encryptor 623 is allowed to receive the data from data storage encryptor 613. Data storage encryptor 613 reads from the encrypted storage system 616 and transmits the read data to data storage encryptor 623. The data storage encryptor 613 and 623 do not decrypt the storage data. Instead, the data bypasses any decryption operation or function so that the transmitted data remains encrypted during transmission over the radio access network. Data storage encryptor 623 receives the data, and authenticates and writes the received data to the encrypted storage system 626.

An approach similar to the above can be used to send data from system 620 to system 610.

In one embodiment, for the above data transfer, there are two levels of authentication: (i) the data storage encryptors 613 and 623 authenticate each other, and (ii) the data transferred between the data storage encryptors is authenticated.

In one embodiment, the first encryptor receives a request to transfer the data to a second computing device at a different physical location (e.g., several kilometers away). In one example, the first encryptor 613 and the second encryptor 623 are each located in different data centers.

In one embodiment, the request to transfer the data can be received, for example, from the first computing device 610 or from the second computing device 620. In response to receiving the request, the first encryptor 613 retrieves the encrypted data from the storage medium 616, and sends, by the wireless communication interface over a wireless network (e.g., 5G network, satellite network, etc.), the encrypted data to a second data encryptor 623 locally connected to the second computing device 620. The second encryptor 623 decrypts the encrypted data using the same at least one key used to encrypt the data.

In one embodiment, each encryptor 613 or 623 is configured to encrypt and store data in a local storage medium (e.g., USB drive). In one embodiment, the storage medium is a flash or other memory device. The memory device may, for example, store data used by a host device (e.g., a computing device of an airplane, autonomous vehicle (e.g. car or truck), submarine, drone, UAV, watercraft such as aircraft carrier, or other computing device that needs to access encrypted data that is stored securely in the memory device). In one example, the memory device is a solid-state drive mounted in an electric vehicle.

In one embodiment, the data stored by an encryptor may include, for example, files or other objects. In one example, a listing of the files is presented on a user interface of a computing device using the encryptor to securely store the files.

In one embodiment, the host device is a mobile device (e.g., Apple iPhone device, IoT device, 5G wireless device, vehicle, or aircraft). In one embodiment, the host device, the encryptor, and the memory device are integrated into a single physical device (e.g., mobile 5G phone device).

In one embodiment, a data at rest encryption device is used for file level data (e.g., NFS, CIF, S3, SMB, TFTP, etc.) for local data storage (e.g., encrypt write and decrypt read) with authentication and/or under control to send/receive encrypted (e.g., storage data or files) for file sharing over cellular (e.g., 5G) service to another data at rest encryption device. In alternative embodiments, the file sharing can be done over Wi-Fi networks and/or internet.

Advantages provided by various embodiments described herein include increased security when transferring data between computing devices at different locations. For example, mobile devices can communicate with one another securely using wireless transmissions for implementing secure transfer of data.

Figure 1:
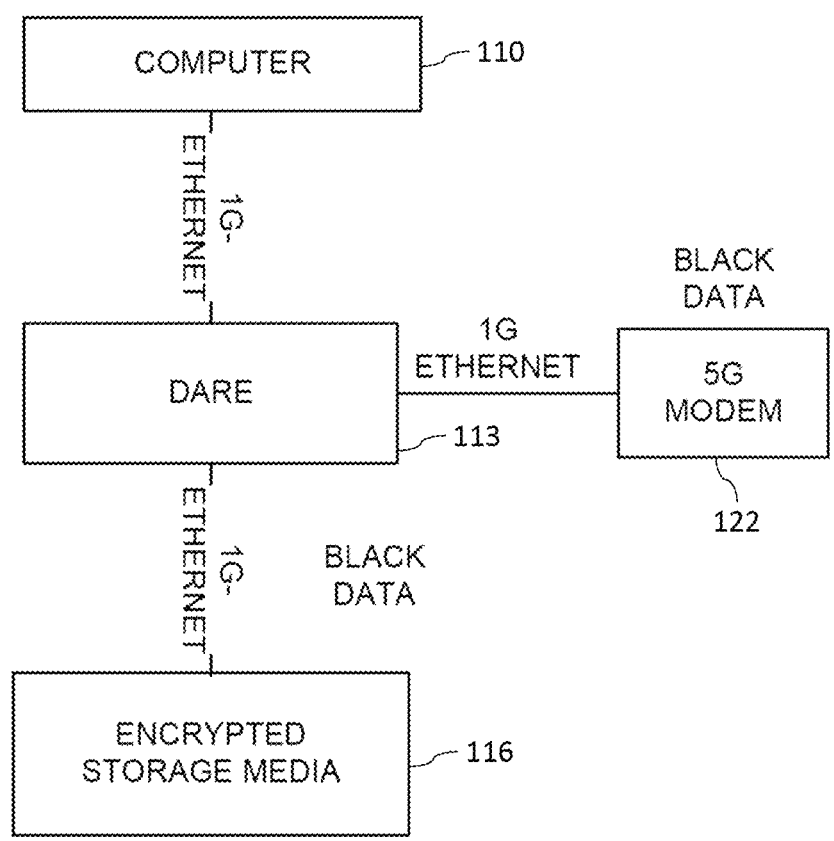
FIG. 1 shows an encryptor that securely stores data in a storage media for access by a computer and/or transmission using a 5G modem, in accordance with some embodiments.

FIG. 1 shows an encryptor that securely stores data in a storage media for access by a computer and/or transmission using a 5G modem, in accordance with some embodiments.

A computer 110 as illustrated (e.g., an aircraft or other vehicle computer system, laptop, or mobile wireless device) provides files or other data to be stored in a storage media 116. The DARE 113 encrypts the file-data and writes the file-data to the storage media 116. The computer 110 reads (e.g., by sending a read request to the DARE 113) the encrypted file-data from the storage media 116. In response to the read request, the DARE 113 decrypts the requested file-data, and sends back the decrypted file-data to the computer.

In addition, the system uses a 5G mode of operation to send or receive data from another source (e.g., another computing device at a different physical location). In one example, a 5G modem 122 is used that is commercial off-the-shelf (COTS) hardware. In one example, the modem 122 is a 5G AT&T, Verizon, or T-Mobile modem, connected to the DARE 113 via a 1G Ethernet local interface. The computer 110 sends the DARE 113 a request to read an encrypted file-data (black data) or to read the entire quantity or all of the data stored on the media 116 (black data), and sends the read data to the 5G modem 122 to transfer the file-data over a 5G network to another system. In this mode of operation, two computers (e.g., computer-A and computer-B of FIG. 2) can securely share file-data over 5G since the file-data is encrypted and decrypted by the DARE 113 at each location.

In one embodiment, the storage medium (e.g., the illustrated storage media 116 in FIG. 1) used by the encryptor 113 can include any of various types of non-volatile storage devices suitable for storing data. Non-volatile storage devices can include NAND flash memory devices. NAND flash is a type of flash memory constructed using NAND logic gates.

In one example, the storage medium 116 is a storage device having a controller that receives data access requests from a host computer (e.g., the illustrated computer 110 in FIG. 1) and performs programmed computing tasks to implement the requests in ways that may be specific to the media and structure configured in the storage devices. In one example, a flash memory controller manages data stored in flash memory and communicates with a computing device (e.g., the illustrated DARE 113 in FIG. 1). In some cases, flash memory controllers are used in solid state drives for use in mobile devices.

Firmware can be used to operate a flash memory controller for a particular storage device. In one example, when a computer system or device (e.g., the DARE device 113 in response to a read request from the computer 110 of FIG. 1) reads data from or writes data to a flash memory device, it communicates with the flash memory controller.

Figure 2:
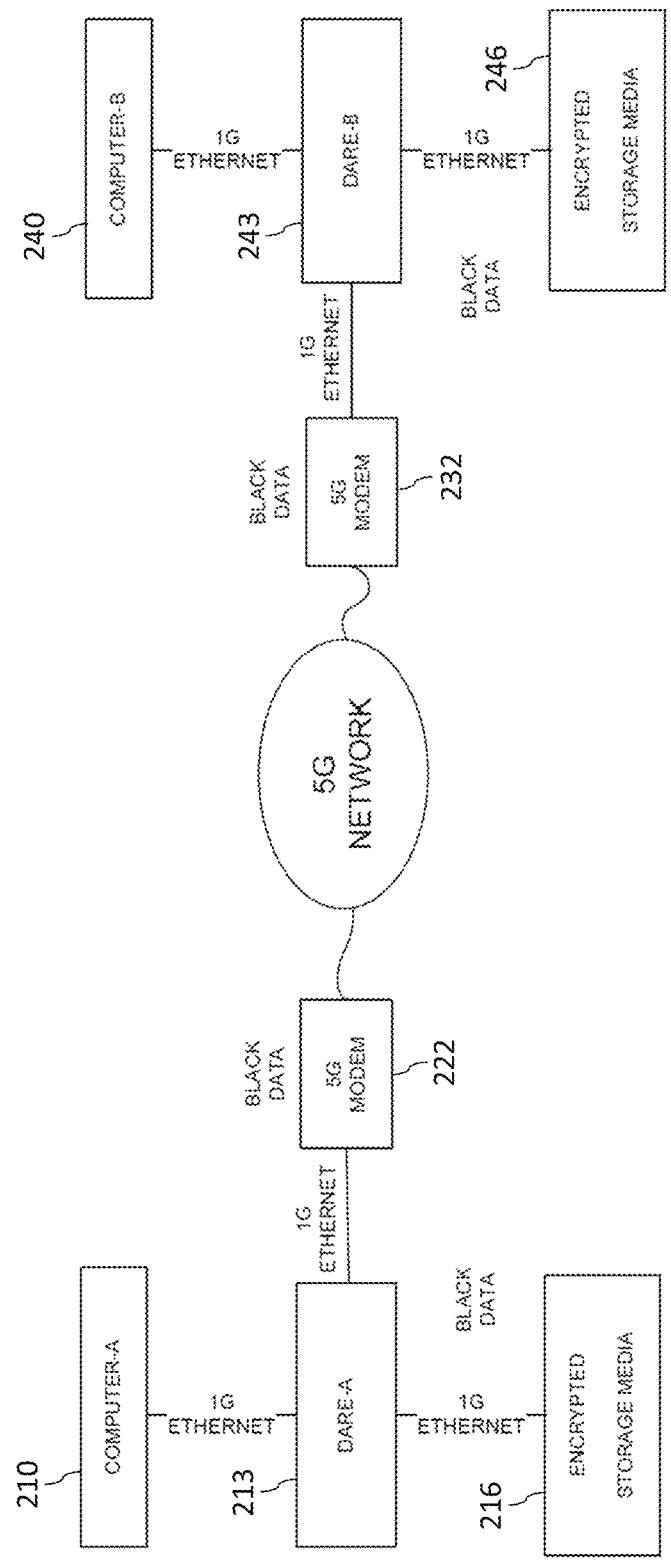
FIG. 2 shows a system for securely transferring data over a 5G wireless network from a first encryptor (DARE-A) to a second encryptor (DARE-B), in accordance with some embodiments.

FIG. 2 shows a system for securely transferring data over a 5G wireless network from a first encryptor (DARE-A) 213 to a second encryptor (DARE-B) 243, in accordance with some embodiments.

In one embodiment, a 5G computer-A 210 to computer-B 240 scenario is described as follows: Two computers (e.g., each computer operated by a user via a user interface) can share files or other data (file-data) by sending encrypted file-data to another computer via a 5G network as illustrated in FIG. 2. For example, computer-A 210 sends encrypted file-data via 5G network through 5G modems 222 and 232 to computer-B 240 and the sent data is stored in a storage media 246 of computer-B 240. Computer-B 240 reads this received data, which is stored in its local storage media. The DARE-B 243 decrypts the data as part of this read operation. The converse scenario in which data is sent from computer-B 240 to computer-A 210 works similarly.

An advantage of the above is the ability to send/receive file-data to other computers (e.g., a computer operated by a user, or operating automatically) and/or securely load another user's data storage media with new file-data over a 5G network. In one embodiment, the data transfers are authenticated by the DARE performing the transfer. The authentication is done prior to sending the data.

In one example, a traveler scenario is as follows: A company's salesperson is traveling doing business and pre-loads the data he/she needs (e.g., the preloaded data is encrypted by the local DARE of the person's computing device such as laptop or mobile phone). While traveling on the road, or by air, the salesperson has the DARE+5G modem system (e.g., single integrated device) connected to his/her laptop, and the DARE is connected to a USB drive (e.g., removeable) with the preloaded encrypted data and connected to a 5G telecommunications carrier.

The salesperson can access the USB drive as is done with other commercially-available external USB drives. The salesperson can then add new file-data to the USB drive. Next, the salesperson sends his/her new file-data over a 5G network back to his/her company (encrypted) using 5G wireless communications. In response to this, the company can now send Gigabytes of data (over a 5G network) to the salesperson with new file-data (e.g., to support his/her customer visits, or to configure new services on a computing device of the salesperson).

In one embodiment, the DARE+5G (e.g., DARE-A or DARE-B) is activated via a secure password. In one example, after three failed password attempts, the DARE will reset (e.g., zeroize). Other authentication methods (e.g., fingerprint, voice recognition) can be used, including combinations of the foregoing methods.

In one example, if the salesperson loses the USB drive, the stored encrypted data on the drive is protected. The DARE+5G system/device is also protected. For example, if the DARE+5G device is lost and the thief knows the password, the company controlling/operating the DARE device can disable the DARE via a command when the DARE attempts to contact a computing system of the company.

The above provides a system and method for the business traveler to access critical company data that can be updated as needed and/or to send data back to the company securely via 5G.

In one embodiment, the DARE-A 213 and/or DARE-B 243 each provide a zero-trust platform for securely storing data at their respective physical locations.

In one embodiment, the encryptor (e.g., DARE-A 213) implements a zero-trust security model. In one example, this model requires continuous verification of all internal and/or external users and/or devices on a network. In one example, the verification is used to limit access to only data that is necessary for a particular user or device. In one example, the model is supported by the use of various security tools. In one example, these tools include multifactor authentication and encryption.

In some embodiments, communication networks described herein, such as communications network(s) (e.g., 5G wireless network) used by a first encryptor to communicate with a second encryptor, can include at least a local to device network such as Bluetooth or the like, a wide area network (WAN), a local area network (LAN), the Intranet, a mobile wireless network such as 4G or 5G, an extranet, the Internet, and/or any combination thereof. Nodes of the networked system (e.g., encryptor for computer A at location 1, encryptor for computer B at location 2) can each be a part of a peer-to-peer network, a client-server network, a cloud computing environment, or the like.

Also, any of the apparatuses, computing devices, and/or user interfaces described herein can include a computing system of some sort. A computing system can include a network interface to other devices in a LAN, an intranet, an extranet, and/or the Internet. The computing system can also operate in the capacity of a server or a client machine in client-server network environment, as a peer machine in a peer-to-peer (or distributed) network environment, or as a server or a client machine in a cloud computing infrastructure or environment.

In some embodiments, the network (e.g., used by computer-A 210 and/or DARE-A 213 to communicate with computer-B 240 and/or DARE-B 243) may be any type of network configured to provide communication between components (e.g., between components of a cloud system). These components may include various data encryptors. For example, the network may be any type of network (including infrastructure) that provides communications, exchanges information, and/or facilitates the exchange of information, such as the Internet, a local area network, wide area network, personal area network, cellular network, near field communication (NFC), optical code scanner, or other suitable connection(s) that enables the sending and receiving of information between the components of the cloud system. In other embodiments, one or more components of the cloud system may communicate directly through a dedicated communication link(s).

In one embodiment, the cloud components may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.). In some embodiments, either one or both of an encryptor and an authentication server may be configured to operate in or with cloud computing/architecture such as: infrastructure as a service (IaaS), platform as a service (PaaS), and/or software as a service (SaaS).

In one embodiment, the data stored in the storage media 216 is one or more files provided from computer-A 210. The DARE-A 213 receives a write request from computer-A 210, then encrypts and stores the files in the storage media 216. The files are encrypted by one or more symmetric keys accessible by DARE-A 213. The same keys are accessible to DARE-B 243.

In one example, the same keys above are loaded into each of DARE-A 213 and DARE-B 243 prior to use. In one example, an information technology administrator electronically or manually loads the keys into the DARE devices. When loading the keys electronically, the keys can be loaded via, for example, Ethernet or USB.

In one example, the keys are indexed so that the appropriate keys can be selected for encrypting data. In one example, each file has a header, metadata, or other indication of an index value so that the proper keys can be selected for encryption/decryption.

In one embodiment, a file system used by computer-A 210 implements a system to manage various files that are stored and accessible by computer-A 210. In one example, a user of computer-A 210 sees (via a user interface) these files as a directory listing. In one example, the directory listing corresponds to files indicated as being stored on a drive. The user can request reading and/or writing of files to the drive. These requests correspond to reading or writing data to the storage media using the DARE-A.

The user can indicate or request by using the user interface that one or more files are to be transferred to computer-B 240 and/or DARE-B 243. In response to this indication/request, DARE-A 213 implements a secure data transfer of the requested files to DARE-B 243, which stores the files in local storage media 246. One advantage of this system is secure file sharing between different computing devices located at different physical locations.

Prior to transferring data, DARE-A 213 authenticates DARE-B 243. Additionally, and/or alternatively, DARE-A 213 can authenticate the user of computer-B 240. Optionally, individual files and/or packets of data can be authenticated prior to transfer.

Figure 3:
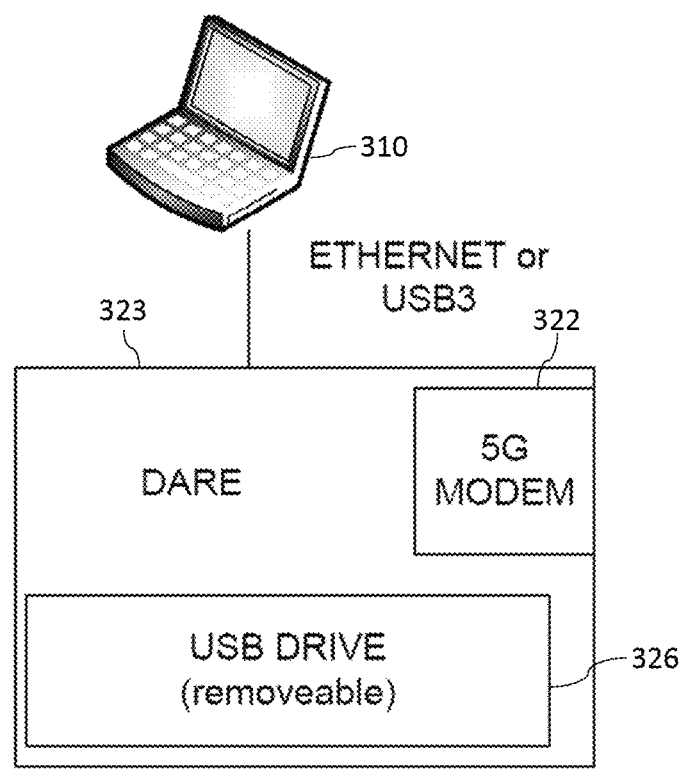
FIG. 3 shows an encryptor that is integrated with a USB drive and a 5G modem, in accordance with some embodiments.

FIG. 3 shows an encryptor 323 that is integrated with a USB drive 326 and a 5G modem 322, in accordance with some embodiments.

In one embodiment, the 5G modem 322 is integrated into the DARE 323 as illustrated.

In one embodiment, the DARE 323, 5G modem 322, and USB drive 326 (e.g., removeable USB drive) are integrated into a single physical package or device.

In one embodiment, the DARE 323 includes a wireless communication interface. In one example, the wireless communication interface includes a 5G modem, which has a SIM card to identify the telecommunications carrier.

In one example, a traveler is traveling and preloads the data he/she needs (encrypted). On the road, air, the traveler has the DARE+5G modem+USB drive connected to his/her computing device 310 (e.g., using Ethernet or USB3) and further connected to a 5G telecommunications carrier. The traveler accesses the USB drive while using the computing device 310 during travel. The traveler can add new files or other data to the USB drive. Next, the traveler sends his/her new file-data over a 5G network connection to another computing device (e.g., back to a computer server of his/her company). In turn, the server can send data over 5G to the traveler with a new file-data to support his/her activities.

The DARE+5G+USB drive integrated device is activated via a secure password provided by the traveler. If the traveler loses the USB drive 326, the stored data is protected because encrypted. The USB drive 326 is removable (always black data) to update to faster technology or larger capacities.

The above provides means for the traveler to access critical company data that can be updated as needed, or to send data back to the company securely via 5G networks regardless of how the 5G networks may protect the 5G link.

In one example, the DARE 323 of FIG. 3 is a first encryptor (e.g., similar to the DARE-A 213 of FIG. 2) that is connected to a client computing device 310 via a host interface of the DARE 323. The client computing device 310 may be any computing device such as desktop computers, laptop computers, tablets, PDAs, smart phones, mobile phones, smart appliances, wearable devices, IoT devices, in-vehicle devices, and so on. According to various embodiments, the client computing device 310 accesses securely stored data using the first encryptor 323.

The accessed data can be provided to the client computing device 310 by the first encryptor 323. The accessed data can be retrieved from local storage on the first encryptor 323 and/or from a storage media at a different physical location and coupled to a second encryptor (e.g., as described above for FIG. 2).

A client computing device (e.g., computer-A or computer-B) may include one or more input devices or interfaces for a user of the client computing device. For example, the one or more input devices or interfaces may include one or more of: a keyboard, a mouse, a trackpad, a trackball, a stylus, a touch screen, a hardware button of the client computing device, and the like. The client computing device may be configured to execute various software applications (e.g., a web browser application) to access the network.

In some embodiments, a first encryptor requires security verifications before granting access to data stored by the first encryptor and/or resources provided by the first encryptor. In some embodiments, the first encryptor may be configured with or coupled to an authentication server for authenticating users and/or devices (e.g., other encryptors). In other embodiments, an authentication server may be configured remotely and/or independently from the first encryptor.

Figure 4:
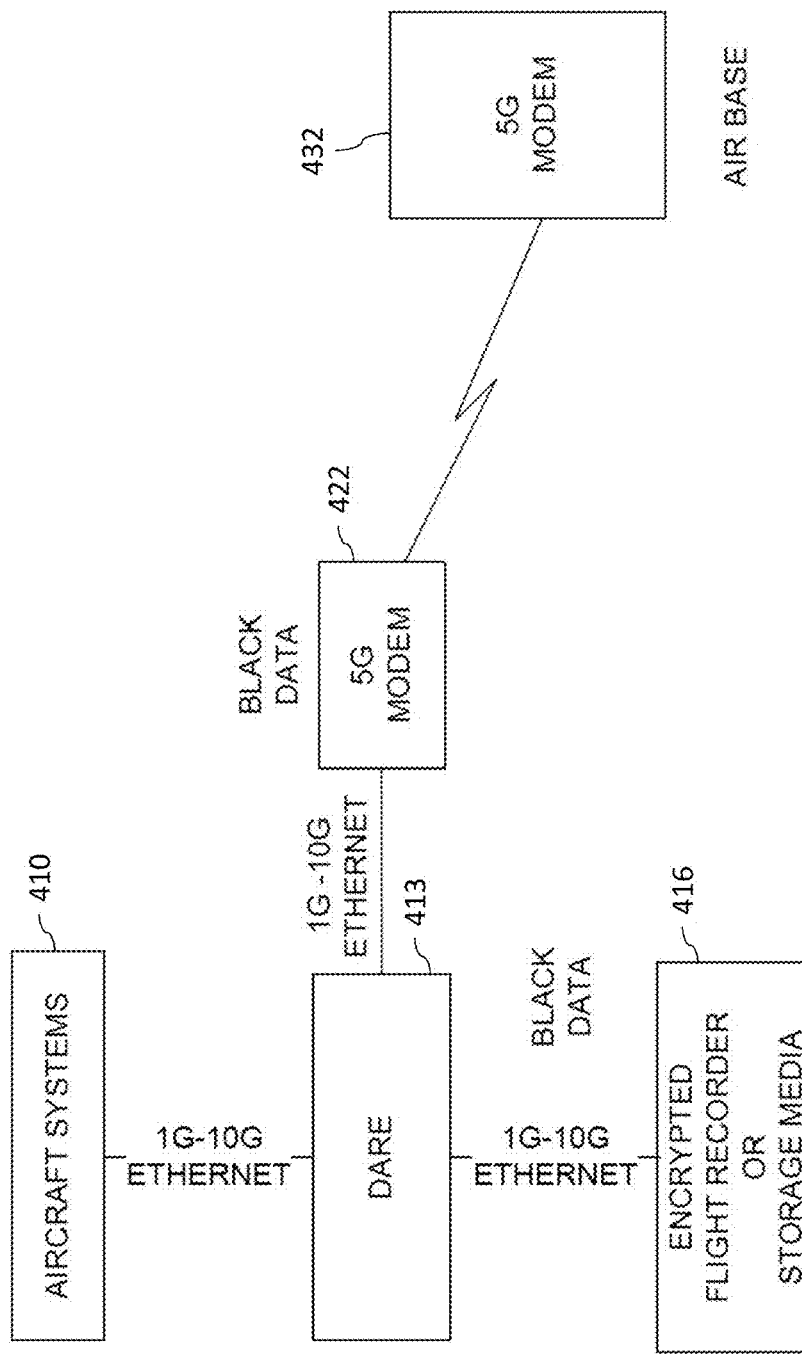
FIG. 4 shows an encryptor for transmitting data between various aircraft (e.g., before, during, and/or after flight), or any other type of vehicle, and an air base or other command center physical facility (e.g., building housing a central control server), in accordance with some embodiments.

FIG. 4 shows an encryptor for transmitting data between various aircraft (e.g., before, during, and/or after flight) and an air base, in accordance with some embodiments. Although aircraft are described as an example, the encryptor can be used with other types of vehicles such as a car, truck, drone, boat, or submarine). Various ones of aircraft (or other type of vehicle) systems 410 are each coupled to a DARE 413. In one example, each aircraft such as a plane or drone has a computing device that is coupled to a DARE by a local interface (e.g., Ethernet). The computing device on each aircraft is an example of computer-A 210 of FIG. 2.

Each DARE 413 of the aircraft systems 410 communicates through a 5G modem 422 with an air base having a 5G modem 432. In one embodiment, the 5G modem 432 of the air base is coupled to a computing device (not shown) located at the air base. The computing device at the air base is coupled to a DARE (not shown) (e.g., DARE-B 243 of FIG. 2). The computing device at the air base is an example of computer-B 240 of FIG. 2. In one embodiment, the 5G modem 432 at the air base is coupled to the DARE at the air base using an Ethernet network interface.

In one embodiment, prior to the flight of an aircraft, encrypted data is uploaded from the air base over a 5G network to the storage medium 416 of the aircraft. During flight and/or after landing, black data is transmitted from the storage media of the aircraft to the air base. In one example, these secure data transfers are used for a training mission.

Figure 5:
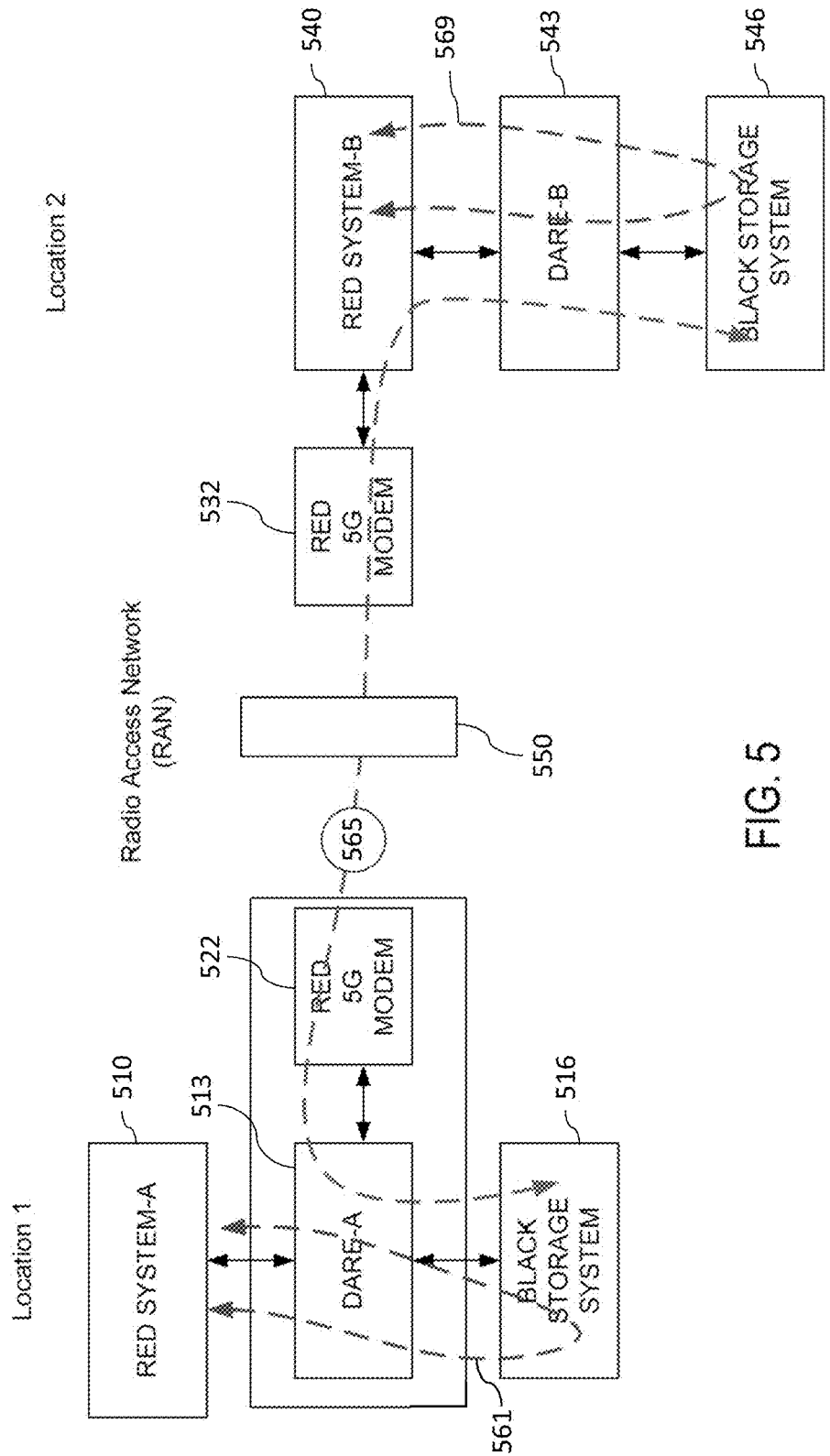
FIG. 5 shows a first encryptor and second encryptor used to securely transfer encrypted data (black data) from a first physical location to a second physical location using a radio access network, in accordance with some embodiments.

FIG. 5 shows a first encryptor and a second encryptor used to securely transfer encrypted data (black data) from a first physical location to a second physical location using a radio access network, in accordance with some embodiments.

Red system-A 510 is an example of computer-A 210 of FIG. 2, and red system-B 540 is an example of computer-B 240 of FIG. 2. The radio access network includes one or more 5G networks.

Red system-A 510 is also an example of an aircraft (or other vehicle) computing device 410 as discussed for FIG. 4. Red system-B 540 is also an example of the air base of FIG. 4.

In one example, as indicated by dotted line 561 in FIG. 5, data generated by a computing device of an aircraft during flight is encrypted by DARE-A 513 and stored as black data in a storage system 516. As indicated by dotted line 565, during and/or after the flight, the encrypted black data is transmitted over a 5G network to red system-B 540 through a 5G modem 522 at location 1 and a 5G modem 532 at location 2. As indicated by dotted line 569, during and/or after the flight, the received black data is decrypted by DARE-B 543, and provided to red system-B 540. In one example, the decrypted data is provided in response to a read request received by the DARE-B 543 from red system-B 540.

In one example, pre-mission: Location 2 transfers encrypted (by the ship board DARE) mission data to the location 1 (e.g., on the deck of the ship). Location 1's DARE-A writes (pass-thru) mission data to its black storage system over 5G.

On-mission, the location 1 system reads and writes data to the DARE-A 513. DARE-A 513 encodes/decodes to the black storage system 516 (e.g., controller and storage media).

On-mission, the location 2 system reads and writes to the ship board DARE-B 543 (encodes/decodes to the black storage system 546).

Post-mission: When the system of location 1 is in range of the location 2 (e.g., carrier) 5G system (e.g., DARE-A 513 performing in response to a control or trigger event), the location 1 system reads the encrypted black storage data and transmits the read data to the location 2 5G system, and the ship board DARE-B 543 writes (e.g., pass-thru) this received transmitted data to the local black storage system 546. Then, the location 2 system reads the mission data via the DARE-B 543 (decrypts).

Advantages for various embodiments of the system of FIG. 5 include the following: Fast mission readiness-transmit/receive mission data from a mission center (e.g., air base) to/from location 1 over the 5G network (e.g., in less than 60 seconds, or less than 5 minutes, depending on data size). No physical removing and installing of the media storage to/from location 1 is required. Saving of time and reducing of handling of the storage media.

In embodiments, a DARE for computer-A includes a host interface, a wireless communication interface, a storage medium to store data, and at least one processing device configured to perform operations comprising: receiving, by the host interface from computer A, data; in response to receiving the data, encrypting the data using at least one key; storing the encrypted data in the storage medium; receiving, from the first computing device, a request to transfer the data to a second computing device, e.g., computer-B; in response to receiving the request, retrieving the encrypted data from the storage medium; and sending, by the wireless communication interface over a network, the encrypted data to the second computing device, wherein the second computing device is configured to decrypt, e.g., using a DARE for computer-B the encrypted data using the at least one key.

As an example, computer-A is configured to implement a file system, and the file system associates a filename of the encrypted data with a directory or folder. Computer-A is further configured to display the filename on a user interface thereof. The file system implements a distributed file system protocol that allows a user of the computer-A to access files over the network from other computing devices, including computer-B. As an example, the file system is a Network File System (NFS).

In embodiments, the processing device is further configured to require that proper authentication credentials be provided by a user of the first computing device prior to retrieving the encrypted data from the storage medium. The processing device is further configured to enter a reset mode in response to a failure to authenticate the authentication credentials provided by the user. As an example, the reset mode includes zeroizing an encryptor that encrypts the data using the at least one key when storing the data in the storage medium.

Figure 7:
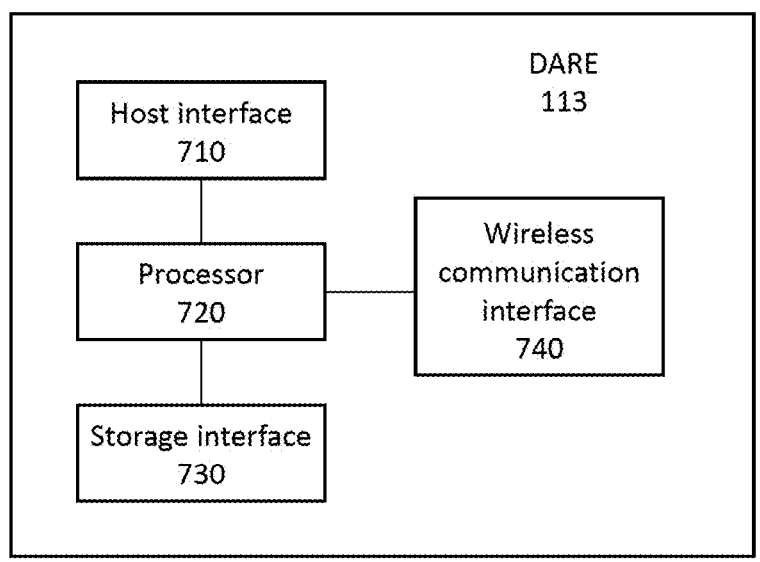
FIG. 7 shows a block diagram of a data at rest encryptor (DARE) in accordance with some embodiments.

FIG. 7 shows a block diagram of the DARE 113 in accordance with some embodiments. The DARE 113 includes a host interface 710, a wireless communication interface 740, a storage interface 730 and a processor 720. The host interface 710 is configured to transmit data and commands with a local computing device that is placed in a close proximity of the DARE 113, so that the DARE 113 can use a wired connection for being connected to the computing device. The wireless communication interface 740 is configured to transmit data and command over a radio access network. The storage interface is configured to interface a local storage medium to store data. The local storage medium is also placed in a close proximity of the DARE 113. The processor 720 is configured to perform operations including encrypting, using a first key, first data from the local computing device to be written into the local storage medium upon receiving a first command from the local computing device; decrypting, using the first key, the encrypted first data from the local storage medium to be read by the local computing device upon receiving a second command from the local computing device; and transmitting the encrypted first data through the wireless communication interface to the radio access network upon receiving a third command.

In one embodiment, a first data storage encryptor receives data from a first computing device using a host interface. In response to receiving the data, the first data storage encryptor encrypts the data using at least one key. The encrypted data is stored in the storage medium. The first data storage encryptor receives a request to transfer the data to a second computing device at a different physical location. The request to transfer the data can be received, for example, from the first computing device or from the second computing device. In response to receiving the request, the first data storage encryptor retrieves the encrypted data from the storage medium, and sends, by the wireless communication interface over a wireless network, the encrypted data to a second data storage encryptor locally connected to the second computing device. The second data storage encryptor decrypts the encrypted data using the same at least one key used to encrypt the data.

In one embodiment, an apparatus [e.g., DARE for computer A] comprises: a host interface; a wireless communication interface; a storage medium to store data; and at least one processing device configured to perform operations comprising: receiving, by the host interface from a first computing device [e.g., computer A], data; in response to receiving the data, encrypting the data using at least one key; storing the encrypted data in the storage medium; receiving, from the first computing device, a request to transfer the data to a second computing device [e.g., computer B]; in response to receiving the request, retrieving the encrypted data from the storage medium; and sending, by the wireless communication interface over a network, the encrypted data to the second computing device, wherein the second computing device is configured to decrypt [e.g., using a DARE for computer B] the encrypted data using the at least one key.

In one embodiment, the host interface is a local area network interface.

In one embodiment, the wireless communication interface is a 5G cellular network modem.

In one embodiment, the storage medium is a flash memory device.

In one embodiment, the storage medium is a removable Universal Serial Bus (USB) storage device.

In one embodiment, the processing device is further configured to implement a zero trust platform.

In one embodiment, the processing device is further configured to authenticate the second computing device prior to sending the encrypted data.

In one embodiment, the processing device is further configured to authenticate the storage medium prior to storing the encrypted data.

In one embodiment, the apparatus is a removable storage device that further comprises a plug for connecting to the first computing device.

In one embodiment, the first computing device is configured to implement a file system, and the file system associates a filename of the encrypted data with a directory or folder.

In one embodiment, the first computing device is further configured to display the filename on a user interface of the first computing device.

In one embodiment, the file system is a network file system implemented by software executing on the first computing device.

In one embodiment, the file system implements a distributed file system protocol that allows a user of the first computing device to access files over the network from other computing devices, including the second computing device.

In one embodiment, the file system is a Network File System (NFS).

In one embodiment, the storage medium is a first storage medium; the second computing device [e.g., computer B] is connected to an encryptor [e.g., DARE for computer B], the encryptor uses a second storage medium to store the encrypted data received from the first computing device, and the encryptor is configured to decrypt the encrypted data; the second computing device is further configured to modify the decrypted data to provide modified data; the encryptor is further configured to encrypt the modified data using the at least one key, and send the encrypted modified data over the network to the first computing device; and the processing device [e.g., DARE for computer A] is further configured to: receive, by the wireless communication interface, the encrypted modified data; and in response to receiving the encrypted modified data, store the encrypted modified data in the first storage medium.

In one embodiment, the processing device is further configured to: receive, by the host interface from the first computing device, a request to read the encrypted modified data; in response to receiving the request to read the encrypted modified data, decrypt the modified data using the at least one key [e.g., DARE for computer A uses same keys as used by DARE for computer B] to provide a decrypted modified data; and send the decrypted modified data to the first computing device.

In one embodiment, the processing device is further configured to require that proper authentication credentials be provided by a user of the first computing device prior to retrieving the encrypted data from the storage medium.

In one embodiment, the processing device is further configured to enter a reset mode in response to a failure to authenticate the authentication credentials provided by the user.

In one embodiment, the reset mode comprises zeroizing an encryptor that encrypts the data using the at least one key when storing the data in the storage medium.

In one embodiment, the data stored in the storage medium is at least one file.

In one embodiment, a first encryptor [e.g., DARE for computer A, or Data Storage Encryptor (1) of FIG. 6] comprises: a host interface configured to receive data from a first computing device [e.g., computer A]; a wireless communication interface; a first storage medium; and at least one processing device configured to perform operations comprising: in response to receiving the data, encrypting the data using at least one key; storing the encrypted data in the first storage medium; receiving a request to transfer the data to a second encryptor [e.g., DARE for computer B]; in response to receiving the request, retrieving the encrypted data from the first storage medium; and sending, by the wireless communication interface over a network, the encrypted data to the second encryptor, wherein the second encryptor is configured to decrypt the encrypted data using the at least one key.

In one embodiment, the second encryptor comprises a second storage medium for storing the encrypted data received from the first encryptor, and the second encryptor is configured to decrypt the encrypted data; the second encryptor is further configured to modify the decrypted data to provide modified data; the second encryptor is further configured to encrypt the modified data using the at least one key, and send the encrypted modified data over the network to the first encryptor; and the processing device [e.g., DARE for computer A] is further configured to: receive, by the wireless communication interface, the encrypted modified data; and in response to receiving the encrypted modified data, store the encrypted modified data in the first storage medium.

In one embodiment, the processing device is further configured to perform operations comprising: prior to sending the encrypted data to the second encryptor, authenticating the second encryptor.

In one embodiment, the encrypted data is sent to the second encryptor via at least one of a 5G modem, a router, or a switch.

In one embodiment, the wireless communication interface is a 5G wireless communication interface.

In one embodiment, the request to transfer the data to the second encryptor is received from the first computing device, the second encryptor, or a second computing device, the second computing device connected to the second encryptor by a local interface.

In one embodiment, a method for a first encryptor [e.g., DARE for computer A, or Data Storage Encryptor (1) of FIG. 6] comprises: receiving data; encrypting the data using at least one key; storing the encrypted data; receiving a request to transfer the data to a second encryptor [e.g., DARE for computer B, or Data Storage Encryptor (2) of FIG. 6]; and in response to receiving the request, sending, over a wireless communications network, the encrypted data to the second encryptor.

In one embodiment, the data is received from a computing device [e.g., computer A] coupled to the first encryptor by a local interface.

In one embodiment, the second encryptor is configured to decrypt the encrypted data using the at least one key.

In one embodiment, the received data is a file.

In one embodiment, after storing the encrypted data, the encrypted data remains encrypted until decrypted by the second encryptor.

In one embodiment, the data is received from a first computing device [e.g., computer-A], and the second encryptor decrypts the encrypted data in response to a request from a second computing device [e.g., computer-B].

In one embodiment, each of the first and second encryptors is a data storage encryptor.

In one embodiment, two levels of authentication are used, the first and second data storage encryptors [e.g., Data Storage Encryptor (1) and Data Storage Encryptor (2) of FIG. 6] authenticate each other, and the data transferred between the first and second data storage encryptors [e.g., the data transfer flow indicated by the circle "2" in FIG. 6] is authenticated.

In one embodiment, the encryptor is a data storage encryptor.

In one embodiment, each of the first encryptor and the second encryptor is a data storage encryptor.

In one embodiment, a non-transitory computer-readable medium stores instructions which, when executed by at least one processing device of a first encryptor [e.g., DARE-A], cause the at least one processing device to: receive data; encrypt the data using at least one key; store the encrypted data; receive a request to transfer the data to a second encryptor [e.g., DARE coupled to computer-B]; and in response to receiving the request, send, over a wireless network, the encrypted data to the second encryptor.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Examples of processing devices include a traditional microprocessor (such as Intel's x86 and x64 architectures), but also matrix processors, graphics processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

In one example, any number of systems (e.g. a DARE, 5G modem, USB drive) or circuits illustrated in the figures may be implemented on a board of an associated electronic device (e.g., computer-A). The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the figured may be implemented as stand-alone modules (e.g., a device with associated components and circuitry configured to perform a specific application or function) or implemented as plug-in modules into application specific hardware of electronic devices.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus comprising:
a host interface configured to transmit data and commands with a local computing device;
a wireless communication interface configured to transmit data and commands over a radio access network;
a storage interface configured to interface a local storage medium to store data; and
at least one processing device configured to perform operations comprising:
encrypting, using a first key, first data from the local computing device to be written into the local storage medium upon receiving a first command from the local computing device;
decrypting, using the first key, the encrypted first data from the local storage medium to be read by the local computing device upon receiving a second command from the local computing device; and
transmitting the encrypted first data through the wireless communication interface to the radio access network upon receiving a third command.

2. The apparatus of claim 1, wherein the host interface is a local area network interface.

3. The apparatus of claim 1, wherein the wireless communication interface is a 5G cellular network modem.

4. The apparatus of claim 1, wherein the storage medium is a flash memory device.

5. The apparatus of claim 1, wherein the storage medium is a removable Universal Serial Bus (USB) storage device.

6. The apparatus of claim 1, wherein the processing device is further configured to implement a zero-trust platform.

7. The apparatus of claim 1, wherein the wireless communication interface transmits the encrypted first data to a remote computing device via an encryptor over the radio access network.

8. The apparatus of claim 7, wherein the encryptor uses the first key to encrypt and decrypt data.

9. The apparatus of claim 8, wherein the first key is installed in both the apparatus and the encryptor prior to the apparatus being coupled to the local computing device and the encryptor being coupled to the remote computing device.

10. The apparatus of claim 9, wherein the third command is from the remote computing device.

11. The apparatus of claim 7, wherein the processing device is further configured to authenticate the encryptor prior to sending the encrypted first data.

12. The apparatus of claim 7, wherein the processing device is further configured to authenticate the remote computing device prior to sending the encrypted first data.

13. The apparatus of claim 1, wherein the processing device is further configured to authenticate the storage medium prior to storing the encrypted first data.

14. The apparatus of claim 1, wherein the local computing device is configured to implement a file system, and the file system associates a filename of the encrypted first data with a directory or folder.

15. The apparatus of claim 14, wherein the file system implements a distributed file system protocol that allows a user of the local computing device to access files over the network from other computing devices, including a remote computing device.

16. A system for securely transferring data wirelessly between a first computing device and a second computing device, the system comprising:
a first encryptor including:
a first host interface configured to transmit data and commands with the first computing device,
a first wireless communication interface configured to transmit data and commands, and
a first storage interface configured to interface a first storage medium to store data; and
a second encryptor including:
a second host interface configured to transmit data and commands with the second computing device,
a second wireless communication interface configured to transmit data and commands, and a second storage interface configured to interface a second storage medium to store data;

wherein the first encryptor is configured to:
encrypt, using a first key, first data from the first computing device to be written into the first storage medium upon receiving a first command from the first computing device, decrypt, using the first key, the encrypted first data from the first storage medium to be read by the first computing device upon receiving a second command from the first computing device, and transmit the encrypted first data through the first and the second wireless communication interfaces to be stored in the second storage medium upon receiving a third command from the second computing device.

17. The system of claim 16, wherein:
the first encryptor is directly coupled to the first computing device and the first storage medium; and
the second encryptor is directly coupled to the second computing device and the second storage medium.

18. The system of claim 16, wherein the first key is installed in both the first and the second encryptors before the first encryptor is coupled to the first computing device and the second encryptor is coupled to the second computing device.

19. A method for securely transmitting data between a first computing device and a second computing device, the method comprising:
encrypting, by a first encryptor using a first key, first data from the first computing device to be written into a first storage medium upon receiving a first command from the first computing device;

decrypting, by the first encryptor using the first key, the encrypted first data from the first storage medium to be read by the first computing device upon receiving a second command from the first computing device; and transmitting the encrypted first data through a radio access network to a second encryptor to be stored in a second storage medium upon receiving a third command from the second computing device;

wherein the first encryptor includes:
a first host interface configured to transmit data and commands with the first computing device,
a first storage interface configured to interface the first storage medium, and
a first wireless communication interface configured to transmit data and commands over the radio access network; and wherein the second encryptor includes:
a second host interface configured to transmit data and commands with the second computing device,
a second storage interface configured to interface the second storage medium, and
a second wireless communication interface configured to transmit data and commands over the radio access network.

20. The method of claim 19, wherein:
the first encryptor is directly coupled to the first computing device and the first storage medium; and
the second encryptor is directly coupled to the second computing device and the second storage medium.

* * * * *